April 21, 1970     J. PETERS     3,507,171
REFORMING DEVICE FOR EYEGLASSES TEMPLE BARS
Filed April 17, 1967
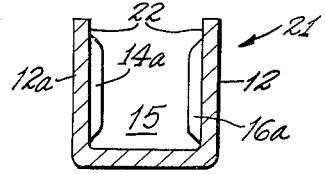
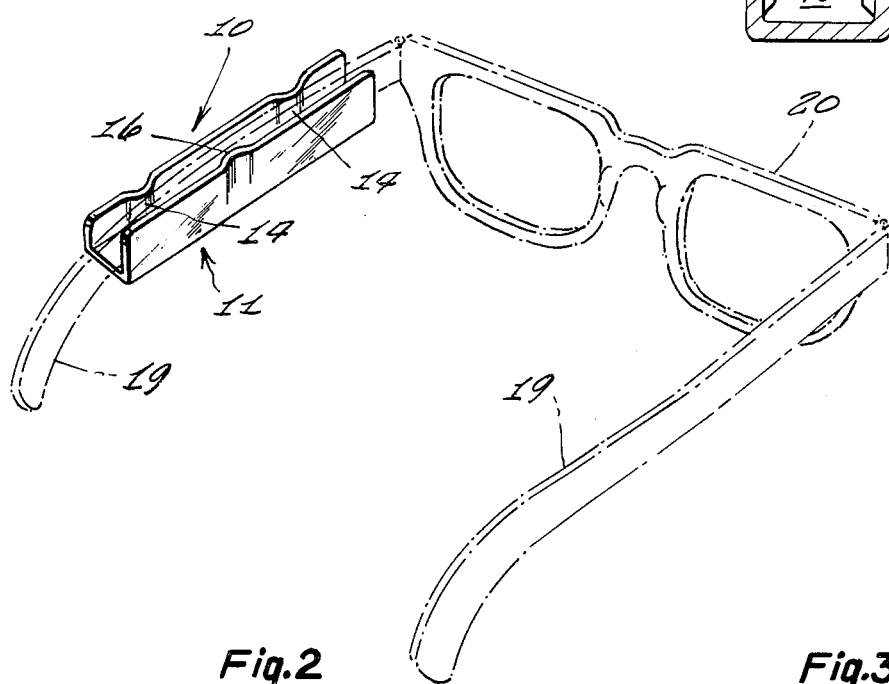
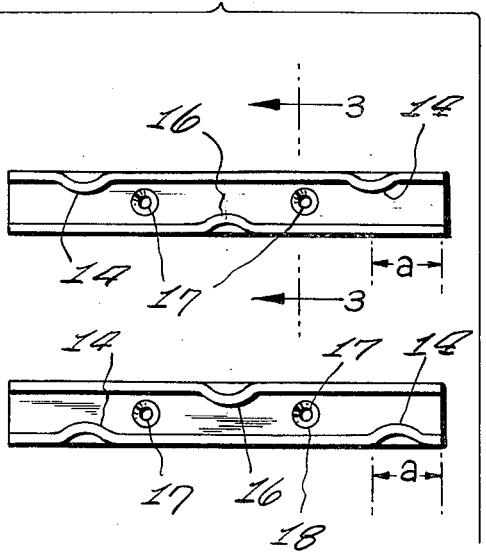
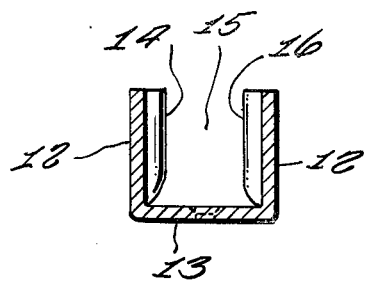
INVENTOR.
*James Peters*

United States Patent Office 3,507,171
Patented Apr. 21, 1970

3,507,171
REFORMING DEVICE FOR EYEGLASSES
TEMPLE BARS
James Peters, R.D. 2, Hollsopple, Pa. 15935
Filed Apr. 17, 1967, Ser. No. 631,393
Int. Cl. B25b 1/00
U.S. Cl. 81—3.5                          3 Claims

ABSTRACT OF THE DISCLOSURE

A form for placement of an eyeglass temple bar thereinto for the purpose of reshaping the temple bar to its original contour to snugly hold against a persons head, the form comprising a one piece, U shaped channel having protrusions therein between which the temple bar is forceably inserted and at the same time flexed toward a corrected direction.

---

This invention relates generally to bending forms. More specifically it relates to forms for restraightening eyeglass temple bars after they become worn and no longer bind against a persons head.

A principal object of the present invention is to provide a form for reshaping the contour of the temple bars of a pair of eyeglasses to the original shape so that they will snugly bind against the side of a person's head. It is generally well known that after a long period of use, that the conventional temple bars secured to an eyeglass frame will tend to become loose and no longer snugly hold against the sides of a person's head, this being caused by the temple bars becoming outwardly flexed.

Accordingly it is another object of the present invention to provide a form for receiving a temple bar and which will apply continuous pressure thereto so to flex it back into the correct direction.

Yet another object of the present invention is to provide a form which can be readily secured to a stationary object and which may be used to flex and reshape other objects as well as serving as a retainer to hold a piece of work being repaired or worked upon.

Yet another object is to provide a form which may be used in the assembly of temple bars to an eyeglass frame, and wherein the form will hold the temple bar while the workers fingers are busy fitting the eyeglass frame thereto.

Other objects of the present invention are to provide a form for eyeglass temple bars which is simple in design, inexpensive to manufacture, rugged in construction, easy to use and efficient in operation.

These and other objects will be easily evident upon a study of the following specifications and the accompanying drawing wherein;

FIGURE 1 is a perspective view of the present invention shown applied to a temple bar of a pair of eyeglasses, FIGURE 2 is a top plan view of a pair of forms used for reshaping both temple bars of a pair of eyeglasses, and FIGURE 3 is an enlarged cross-sectional view taken along the line 3—3 of FIGURE 2.

FIGURE 4 is an enlarged cross-sectional view similar to FIGURE 3 and showing a modified construction.

Referring now to the drawing in detail, reference numeral 10 represents a form for reshaping the temple bars of an eyeglass wherein there is a one piece member 11 that is of generally channel shaped configuration and having a pair of parallel spaced apart side walls 12 which are connected together at their one ends by an intermediate wall 13.

One of the side walls 12 is provided with a pair of inwardly extending projections 14 that extend into the channel 15 formed by the channel shaped member. The opposite side wall 12 is provided with a singular projection 16 extending inwardly into the channel 15, the projection 16 being located approximately midway between the projections 14. The projections are formed by the side walls being simply inwardly bent as is shown in the drawing.

The interconnecting wall 13 may be provided with a plurality of openings 17 that are countersunk upon the channel side for purpose of receiving countersunk head screws so to allow the form 10 to be secured to any supporting wall or block.

It is to be understood that the distances apart of the projections on one side to the projection therebetween on the other side need not necessarily be equal but may be varied if preferred for a purpose which will be indicated below.

In operative use, the temple bar 19 of a bar of eyeglasses 20 and which is made of Plexiglas or plastic material tends to flex out of shape after a long time of use and it no longer binds snugly against the side of a person's head so to support the eyeglasses. In such cases it is necessary that the temple bars be again reshaped to their original contour and thus providing again a proper support for the eyeglasses upon a person's head. Accordingly, such temple bar may be inserted into the form 10, as shown in FIGURE 1 of the drawing, wherein the temple bar under continuous flexing pressure so to restore its shape. The thickness of the temple bar will be slightly greater than the distance between opposite sides of the projections thereby causing the temple bar to flex concavely about the projection 16. This corrective reforming operation may be conducted at any time when the eyeglasses are not in use, so as during the hours of the night when a person has removed the eyeglasses from his head.

In FIGURE 4 of the drawing, there is shown a modified construction 21 of the present invention wherein the inward extending projections 14a and 16a are relatively shorter in length than the side walls 12a so as to allow a relatively wider gap in the channel 15 between the portions 22 of the walls so as to allow easy introduction of the temple bars therebetween.

While various changes may be made in the detailed construction it is to be understood that such changes will be within the spirit and scope of the present invention as is defined by the appended claims.

I claim:

1. In a form for reshaping the contour of a temple bar of a pair of eyeglasses, the combination of a one-piece member, said one-piece member having self-contained means for being fitted upon a temple bar requiring contour correction, and the said member having self-contained means for delivering continuous flexing pressure for gradually reshaping said temple bar, said member being of generally channel shaped configuration and having a pair of parallel spaced apart side walls, said side walls being interconnected at their one ends by an interconnecting wall therebetween, and said side walls having self-contained means of producing flexing action, one of said side walls being provided with a pair of spaced apart projections extending inwardly into said channel, and the other of said side walls being provided with a singular projection extending inwardly into said channel, said singular projection being located between said projections of the other of said side walls.

2. The combination as set forth in claim 1, wherein said singular projection on one of said side walls in equal distance between said projections on the other of said side walls.

3. The combination as set forth in claim 1, wherein said singular projection on one of said side walls is located relatively closer to one of said projections on the other of said side walls than to the second of said projections in said side wall for the purpose of forming an eliptical end in said temple bar.

References Cited

UNITED STATES PATENTS

| 1,590,682 | 6/1926 | Hart | 24—257 |
| 2,516,512 | 7/1950 | Filter | 81—3.5 |

LESTER M. SWINGLE, Primary Examiner

R. V. PARKER, Jr., Assistant Examiner